United States Patent [19]

Mazer

[11] Patent Number: 5,471,404
[45] Date of Patent: Nov. 28, 1995

[54] OCCLUSION DETECTION SYSTEM FOR LOCATOR DEVICES

[76] Inventor: Murray S. Mazer, 7 Mountain Ave., Somerville, Mass. 02143-1308

[21] Appl. No.: 173,437

[22] Filed: Dec. 23, 1993

[51] Int. Cl.$^6$ .................................................. G01S 3/02
[52] U.S. Cl. .............. 364/516; 340/825.54; 340/825.49; 340/825.08; 455/67.4
[58] Field of Search .................. 379/57; 340/825.54, 340/313, 311.1, 825.1, 825.49, 825.08; 455/67.1, 67.4; 364/516

[56] References Cited

U.S. PATENT DOCUMENTS

| | | |
|---|---|---|
| 4,601,064 | 7/1986 | Shipley . |
| 4,649,385 | 3/1987 | Aires et al. ............................. 379/57 |
| 4,940,963 | 7/1990 | Gutman et al. ........................ 340/313 |
| 5,062,151 | 10/1991 | Shipley . |
| 5,317,309 | 5/1994 | Vercelloti et al. .................. 340/825.54 |

FOREIGN PATENT DOCUMENTS

93/00476 9/1993 WIPO .

OTHER PUBLICATIONS

Roy Want and Andy Hopper, "Active Badges and Interactive Computing Objects," Feb. 1992, IEEE Trans. vol. 38, No. 1.
Roy Want etcl., "The Active Badge Location System", Jan. 1992, ACM Transactions on Info; vol. 10, No. 1.

Primary Examiner—Ellis B. Ramirez
Assistant Examiner—Thomas Peeso
Attorney, Agent, or Firm—A. Sidney Johnston; Christine M. Kuta

[57] ABSTRACT

A system to enable individual locator devices or badges developed for location of people or objects to (1) determine whether their identification transmissions are received by sensor stations and to (2) take appropriate actions when the transmissions are not received. Each badge in the system can transmit to any sensor station in the system a request for an acknowledgement within a set interval of time. Each time a sensor station receives a request for acknowledgement from a badge the sensor station sends a message of acknowledgement to the badge. If the badge does not receive an acknowledgement within the set interval of time, the badge takes appropriate action due to its occlusion from the system. If the badge receives an acknowledgement within the interval of time, it resets its internal timer.

26 Claims, 9 Drawing Sheets

FIG. 5(a)
ACTIVE BADGE

OCCLUSION DETECTION SYSTEM FOR LOCATOR DEVICES

BACKGROUND OF THE INVENTION

The present invention relates to computer-based communication systems that are used to locate people or other objects within a building or a campus. These systems can be used for locating personnel, security, inventory tracking, providing access to secured areas, diaries, environmental management, control of computer systems, and a variety of other purposes.

These systems typically comprise portable transmitters (sometimes named active badges because of their small size and application) and receiving stations (located in various locations) which sense the transmissions from the badges. Mobile carriers, such as people or equipment, carry the individual badges which transmit state information (such as identification codes) to the recipient sensor stations, which receive the state information. The sensor stations either store the information internally, report it to other aspects of a computer-based locating system, or perform some local action depending on the application. The badge transmissions may be generated periodically according to internal timers or may be generated by external stimuli (such as pressing a button on the badge). The sensor stations may be mobile or fixed.

The sensor stations are typically located so as to optimize their ability to determine the location of objects or personnel within the parameters of the communication system. The badges and sensor stations transmit via a wireless communication channel (e.g., infrared or radio frequency). The computer-based locating system uses the dynamically acquired state information to provide timely data on the carriers' locations, for locating, adapting the environment for particular carriers, recording in a central database, paging, and for other purposes where locating and identification are important.

From time to time, based on the relative positions of the badges and the sensor stations, a badge's transmission may be occluded from all sensor stations. That is, none of the sensor stations within the communication system are able to receive the badge transmissions due to an obstruction, the badge leaving the parameters of the system, or due to some other interference. The locating system may recognize this occlusion, for example, by comparing its database of active badges with identification codes of recently received transmissions. However, the individual badges and carriers can be totally unaware of the occlusion. This reduces the quality and timeliness of the information provided by the locating system. This reduces its effectiveness and value both to the carrier and to the users of the locating system, especially in critical applications such as their use in hospitals.

SUMMARY OF THE INVENTION

It is an object of this invention to provide individual locator badges the ability to determine whether their transmissions are being received and to take appropriate actions, on demand or automatically. For example, the badge can report an occlusion to its carrier or another agent in the area to eliminate the causes of occlusion and permit sensor stations to receive badge transmissions.

A further object of this invention is to provide an occlusion detection system wherein either the badge or sensor station can enable or disable the occlusion detection means or the actions that result from the detection.

Yet another object of this invention is to provide an occlusion detection means that is flexible enough to change its mode of operation according to external conditions, e.g., low battery power.

In order to correct the deficiency of a badge being unaware of its occlusion from a system, a badge needs to determine, on an ongoing basis, whether its transmission is being received at any sensor station. If not, the badge or carrier can then undertake some action, with one of its goals being the return of its transmissions to the communication system.

In general, this invention provides for occlusion detection in a locating and identification system comprising a plurality of active badges carried by a plurality of carriers within a predetermined area, each badge having an transmitter circuit for transmitting a unique identification signal. The system can additionally provide for a plurality of transceiver sensor stations in the predetermined area able to communicate both with the active badges and with a master control center.

Each time a sensor station receives a transmission from a badge, the sensor station sends a message of acknowledgement to the badge. When the badge receives the acknowledgement, the badge resets an internal interval timer. The interval measured by the timer may be fixed at badge build time or may be programmable, by an agent or by commands sent from the sensor stations. Usually, during the interval, either at a time fixed for the badge or upon some other stimulus, the device sends another transmission asking for an acknowledgement. If the interval timer expires before an acknowledgement is received, the badge takes actions appropriate to its occlusion from the system of sensor stations, e.g., sound an alarm.

BRIEF DESCRIPTION OF THE DRAWINGS

5(a), 5(b), and 5(c) comprise functional flow charts illustrating the operation of an active badge system which incorporates this invention.

DESCRIPTION OF A SPECIFIC EMBODIMENT

Figure 1:
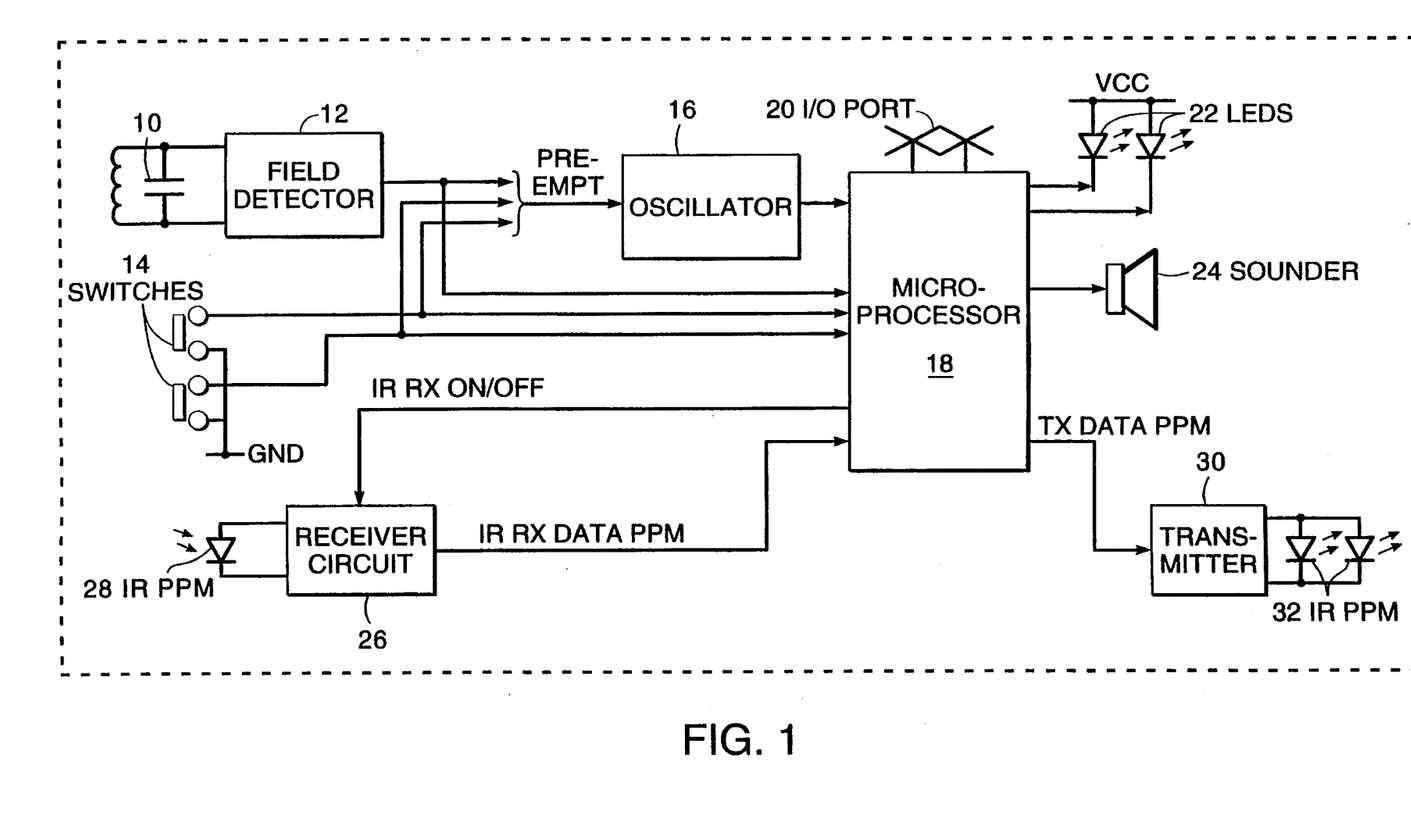
FIG. 1 is a block circuit diagram of an example of an active badge which could be used in this invention.

Referring to FIG. 1, the principal components of an example of an active badge for use in the system of the invention are as follows:

A passive tuned circuit 10 acts as an RF field detector. The resonant frequency of this circuit 10 corresponds to a frequency generated by an RF field generator circuit;

A low current comparator 12 monitors the output of the tuned circuit 10, which, in combination with the circuit 10, forms a field detector circuit. When a field of suitable frequency and strength is detected, the comparator output changes state to stimulate the badge and cause, for example, an IR transmission;

One or more pushbutton switches 14 which can also be used to stimulate the badge.;

An astable relaxation oscillator 16, with an approximate 10 second timeout which is variable from badge to badge and is adjustable. This oscillator allows the badge to enter and exit a sleep mode condition that allow the badge to conserve power. Once the badge times out of its sleeping condition it becomes operative for a listening period. It is possible to preempt the timeout period of the relaxation oscillator 16; e.g., this can occur by entering an RF field or pressing either or both of the pushbutton switches 14;

A microprocessor 18 which is the main component of the badge. it constitutes a controller, coding and decoding information and responding in a manner predetermined by the program information contained in the microprocessor. It can also be used to provide other timing intervals used in this invention;

A bi-directional digital I/O port 20 appertaining to the microprocessor 18 can be used to attach external control and monitoring equipment, such as a temperature sensor, and to cause some action external to the badge in accordance with this invention when a badge becomes occluded. For example, a signal may be sent to a nearby receiver to turn on a trouble light;

One or more visible light emitting diodes (LEDs) 22 used to provide an indication of internal status information or occlusion in accordance with this invention;

A sounder 24 used to provide audible signalling information, bleeps and tunes which may be used to signal an occlusion in accordance with this invention;

A receiver circuit in the badge (26 and 28) that is operative when the badge is awake. If the system is using IR as the medium of transmission this can be accomplished through an IR pre-amplifier circuit 28 and receiver diode 26; and A transmitter (30 and 32) for transmitting identification and other data from the badge. If IR is the chosen medium the transmitter can be comprised of a field effect transistor (FET) 30, and one or more IR transmitting diodes 32.

Figure 2:
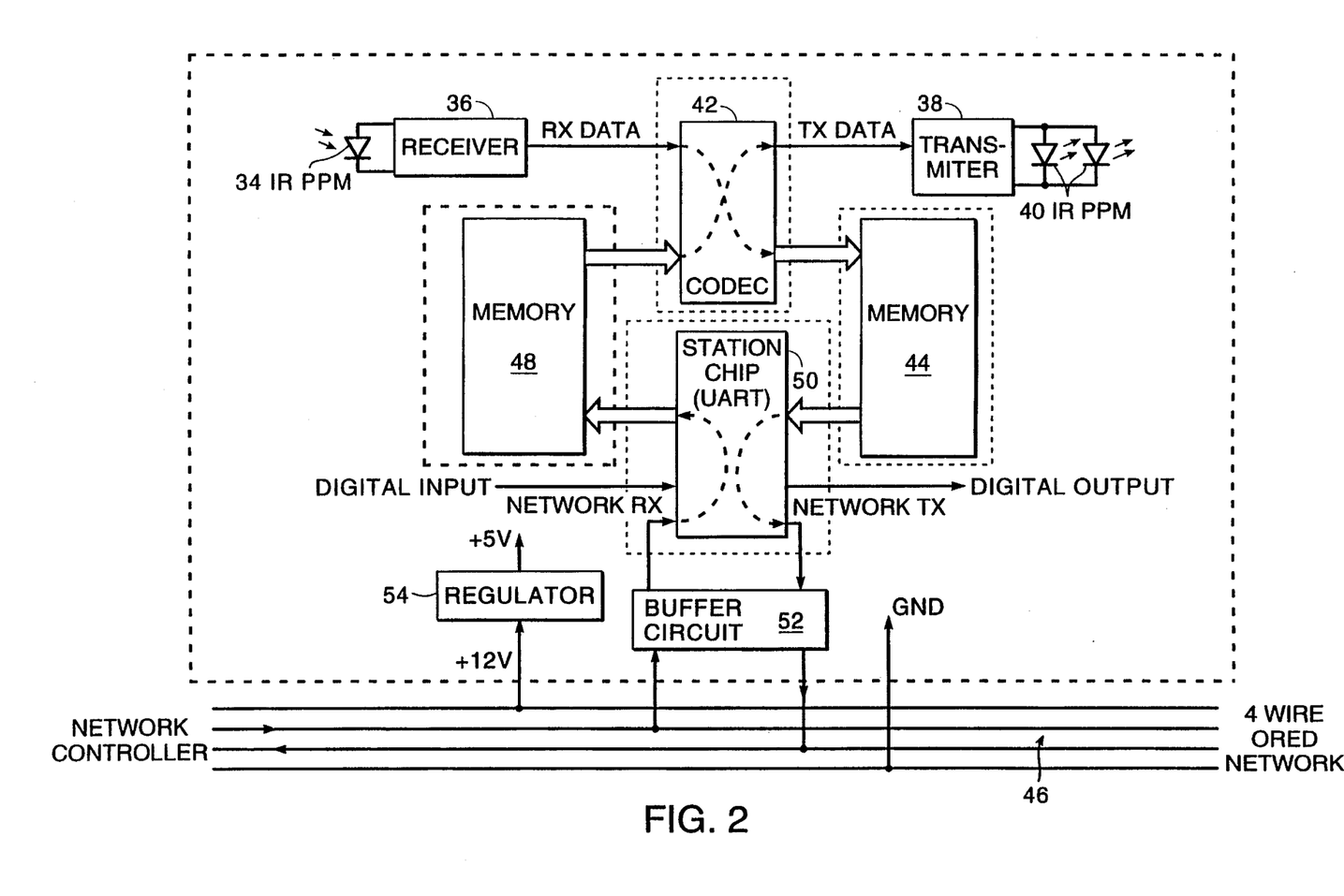
FIG. 2 is a block circuit diagram of a sensor station which can be used with the active badge of FIG. 1.
Figure 3:
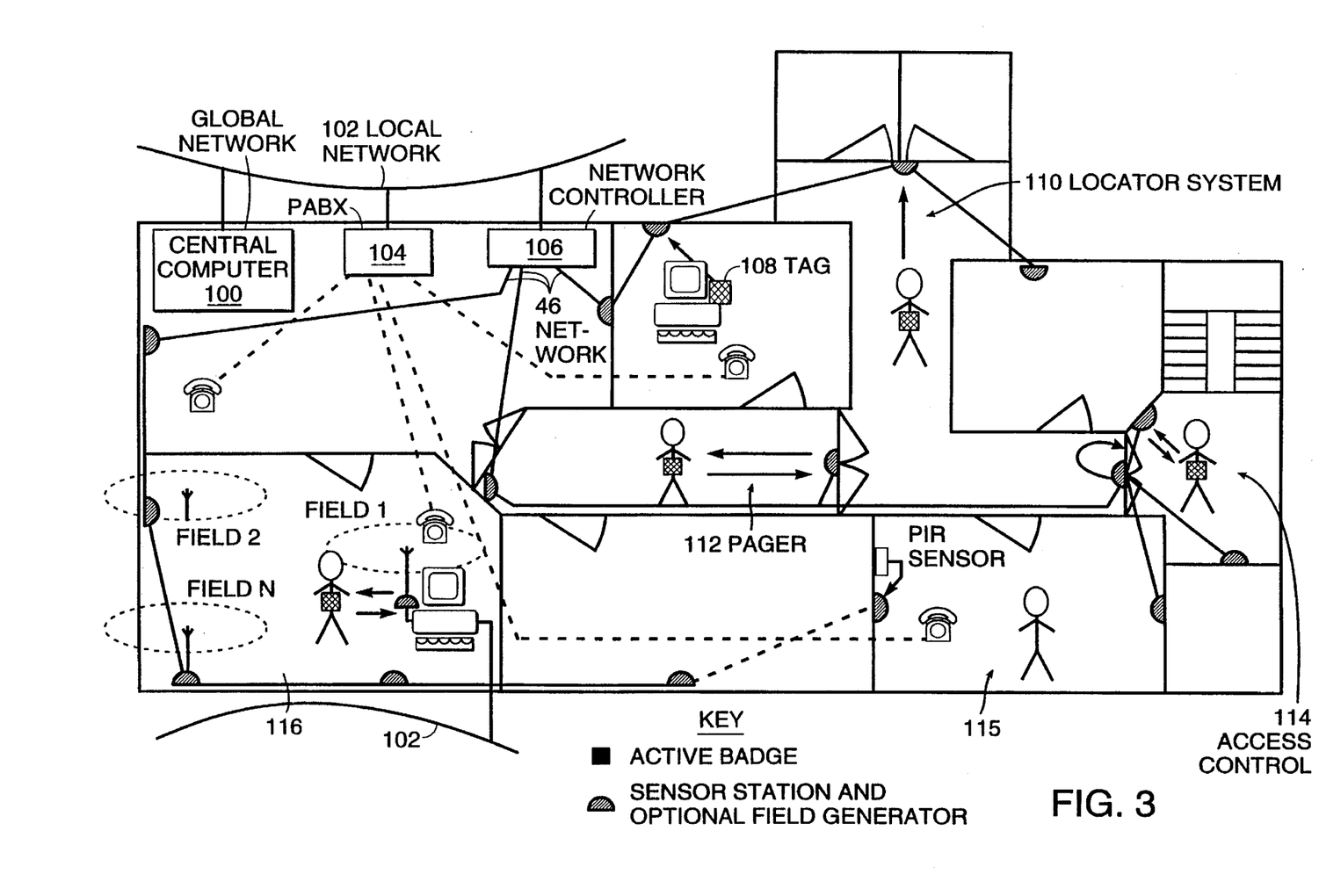
FIG. 3 shows a typical layout of an identification and location system within a building.

Referring now to FIG. 2, there is shown one of the transceiver sensor stations which would be placed around a building or site to communicate with the active badges. The major component parts of these sensor stations are as follows:

A receiver (34 and 36) which receives signals transmitted from the active badges. If the transmission medium is IR, an IR receiver diode 34 and IR preamplifier circuit 36 constitute a suitable receiver;

A transmitter (38 and 40) for transmitting identification and other data to the badge. If IR is the chosen medium, the transmitter can be comprised of a field effect transistor (FET) 38, and one or more IR transmitting diodes 40;

An coder-decoder (CODEC) circuit 42, with program information placed within its internal memory. This part of the circuit is used to perform the function of decoding and checking transmissions received from the IR receiver 34, 36. The CODEC 42 also performs the function of taking data from memory 48, coding the information for transmission, and transmitting it via the IR transmitter 38, 40. Memory 44 is used to buffer data received by the CODEC 42 for later onward transmission across a network 46, while memory 48 provides buffering of data to be sent from the station via the transmitter, and data received from the network 46 described below;

The station chip 50 which is a component that implements the functionality of a device commonly known as a universal asynchronous receiver transmitter (UART). It communicates with the network 46, via a buffer circuit 52, checking and converting the data received; and Regulator 54 regulates the power supplied to the station from the network 46. This can be accomplished through wiring no more complex than that for a simple telephone system, or in a variety of other forms some of which are discussed in regards to FIG. 3;

FIG. 3 indicates a typical building layout, showing the units of the tracking and identification system which have been described with reference to FIGS. 1 and 2. The interconnection of the components is indicated, and descriptions of their use are given below:

A site computer facility 100 represents a central computer which is not essential for operation of the system, but is shown to provide an indication of how a typical system might be constructed. The computer facility 100 may be, for example, a simple shared file server, or a large multi-user mainframe. The central computer facility may be used to form a communications link to the outside world.

A local communications network 102 represents an existing communications infrastructure (e.g. Ethernet, Token ring). The local network 102 is normally used to interconnect PCs, workstations, remote printers and various pieces of equipment.

Reference 104 denotes a PABX telephone exchange system, connected to the site computer infrastructure. This may be altered under software control (e.g. telephone calls being automatically re-routed, personal short-codes dynamically allocated to an extension as a user picks up the phone).

Reference 106 denotes the network controller; it is the central point from which the network 46 emanates. The simplest form of controller may be a single RS232 serial port of a PC or workstation. The controller 106 manages the communications to each of the sensor stations (FIG. 2); it collects the data and statistics (e.g. station problems, stations being connected or disconnected)and exchanges data with the rest of the site system.

Also shown are 4-wire networks 46, which are the physical wire connections which link the various system units placed around a building.

Reference 108 indicates an example of tagging objects or equipment. This tagging application can be used, for example, for inventory control, allowing lists of items and their locations to be automatically generated (e.g., video indexing). Using the digital I/O port of the active badge (FIG. 1) the status of the equipment can be monitored and altered (e.g. is it on or off? If it is off then turn it on).

Reference 110 indicates an example of use of the system for location of a person. By tracking the movement of people, the system can monitor their positions and report accordingly. The location information can be used by the system, for example to dynamically reprogram the PABX and hence re-route calls to the nearest telephone extension. The I/O port of the active badge (FIG. 1) may be used to return additional information along with location information. Also, if a temperature sensor or pulse monitor were attached to the badge, then the badge could return biomedical information regarding the health of the wearer. Thus the badge could be used for continual unobtrusive monitoring of a patient.

Reference 112 indicates use of the system as a pager. As it is possible to send commands and data to the badge, it is possible to instruct it to provide visual and audible signalling information, i.e., basic paging.

Reference 1214 indicates use of the system for access control. As a badge-wearing person approaches a door, the badge will communicate with the sensor station positioned at the door. Data will be exchanged with the central controller; the system will issue an authentication command to the badge, along with a random number. The badge will return a challenge encrypted value, based on the badge password, and the system will confirm the authenticity of the badge.

As indicated at 115, when coupled with a movement detection or alarm mechanism, the active badge system can be used to identify when people are present in the building, but not wearing active badges. Such a condition could be deemed an alarm condition, and the building security department alerted over the 4-wire network.

It is noteworthy that for many of the uses for active badges illustrated in FIG. 3 that it could be important that a badge recognize its occlusion from the system, as well as the system recognize the badge's occlusion. For example, in 115 if a badge wearer was occluded due to something obstructing a badge's signal, the system would perceive the individual as a non-wearer. Unless the obstruction is removed, a false alarm condition could occur causing a disruption for site personnel.

Figure 4:
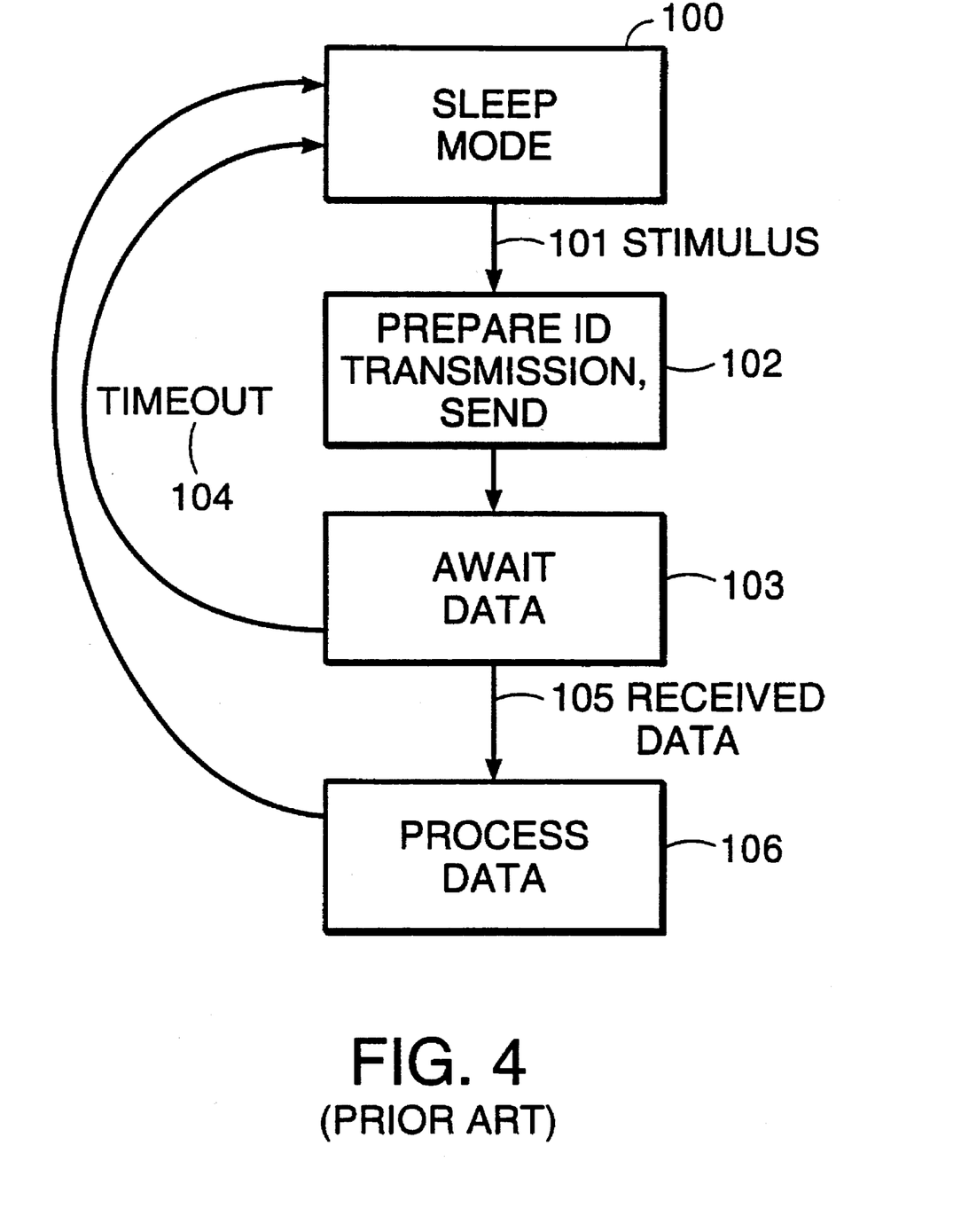
FIG. 4 is a functional flow chart illustrating the operation of a conventional prior art badge in a locating system.

FIG. 4 illustrates a flowchart for a conventional prior art active badge. Block 100 indicates that the active badge is in its sleep mode to conserve energy. Upon some stimulus 101, e.g., the carrier pushing a button, upon self-initiation from its internal clock, or the carrier entering an RF field, the badge enters its "awake mode". The badge then enters a transmit phase 102 where it transmits its identification data and any other applicable status information. After transmitting, it enters a listening mode 103 where it awaits any data or commands that may be sent to it. If it does not receive data within a predetermined time, the badge executes a timeout action 104 where it reverts to its sleep mode. If data is received, the badge takes branch 105 and then processes the data through action 106, either by storing it or using it in some manner. After a "process data" stage is finished the badge typically returns to its sleep mode.

Generally, badges have a power-driven sleep mode to conserve battery life. However, it is not necessary to practice this invention that the badge have a sleep mode. Block 100 could as easily be referred to as an "idle state" or simply a state where the badge is neither transmitting to sensor stations nor receiving information from sensor stations. For example, the badge may be performing some other activity, like acting as a hand held calculator, while in this mode.

Figure 5A:
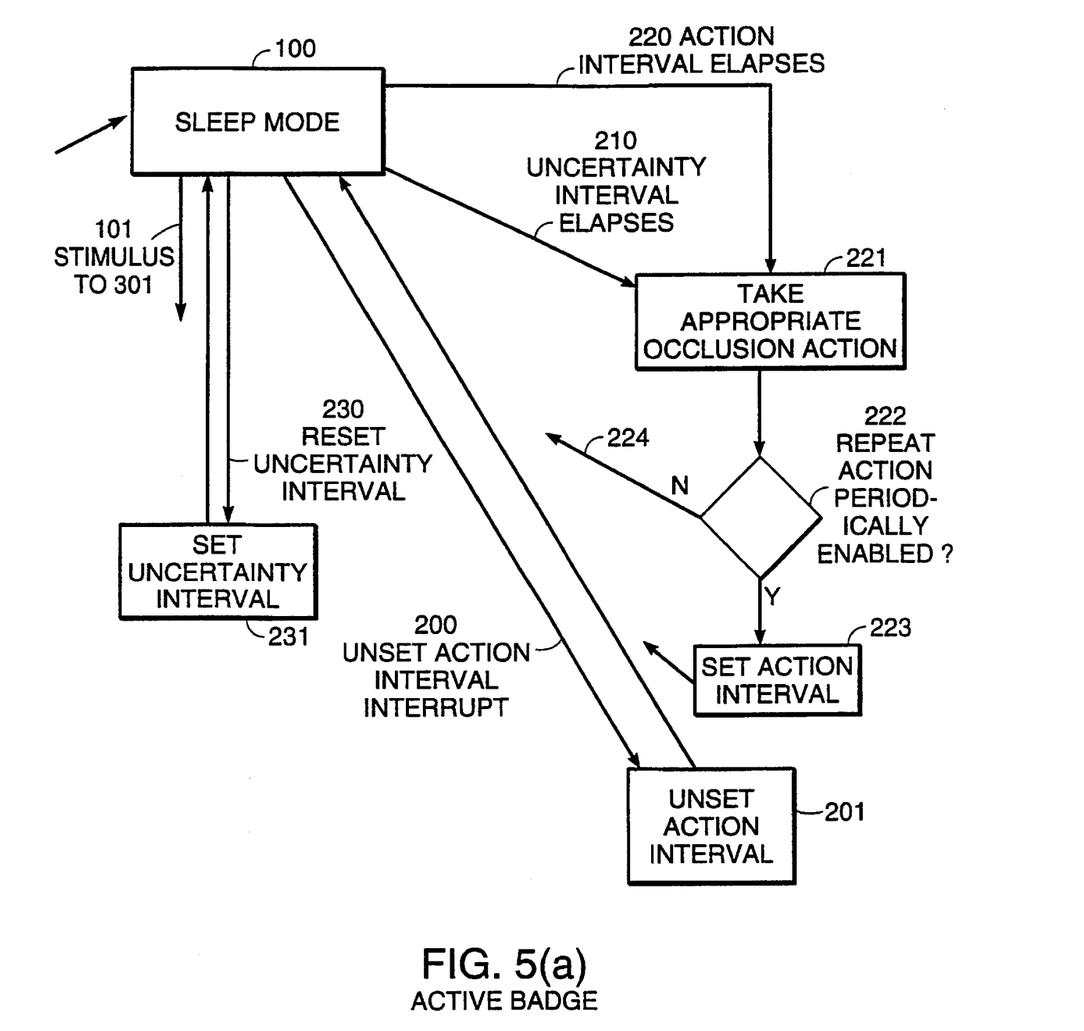
Figure 5B:
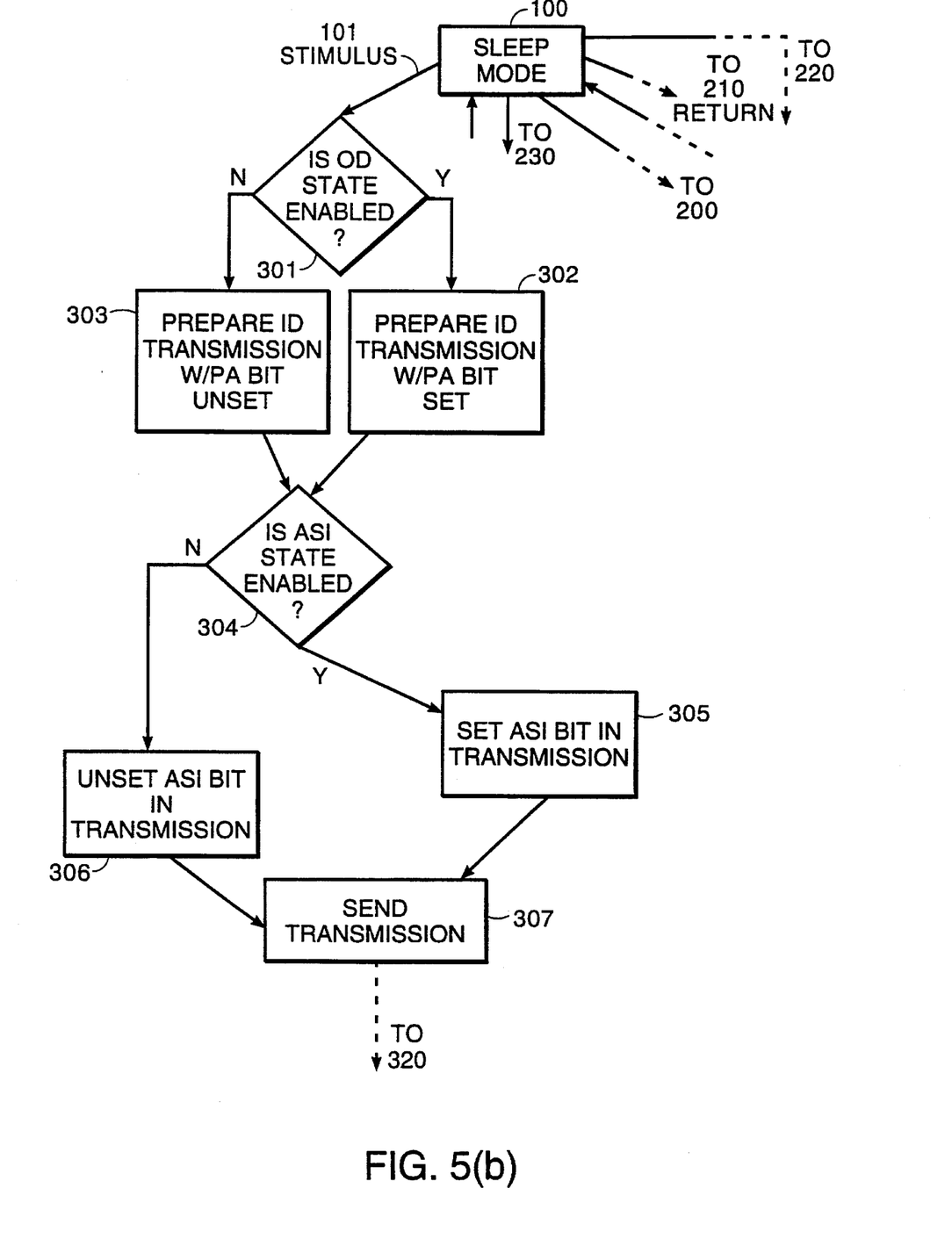
Figure 5C:
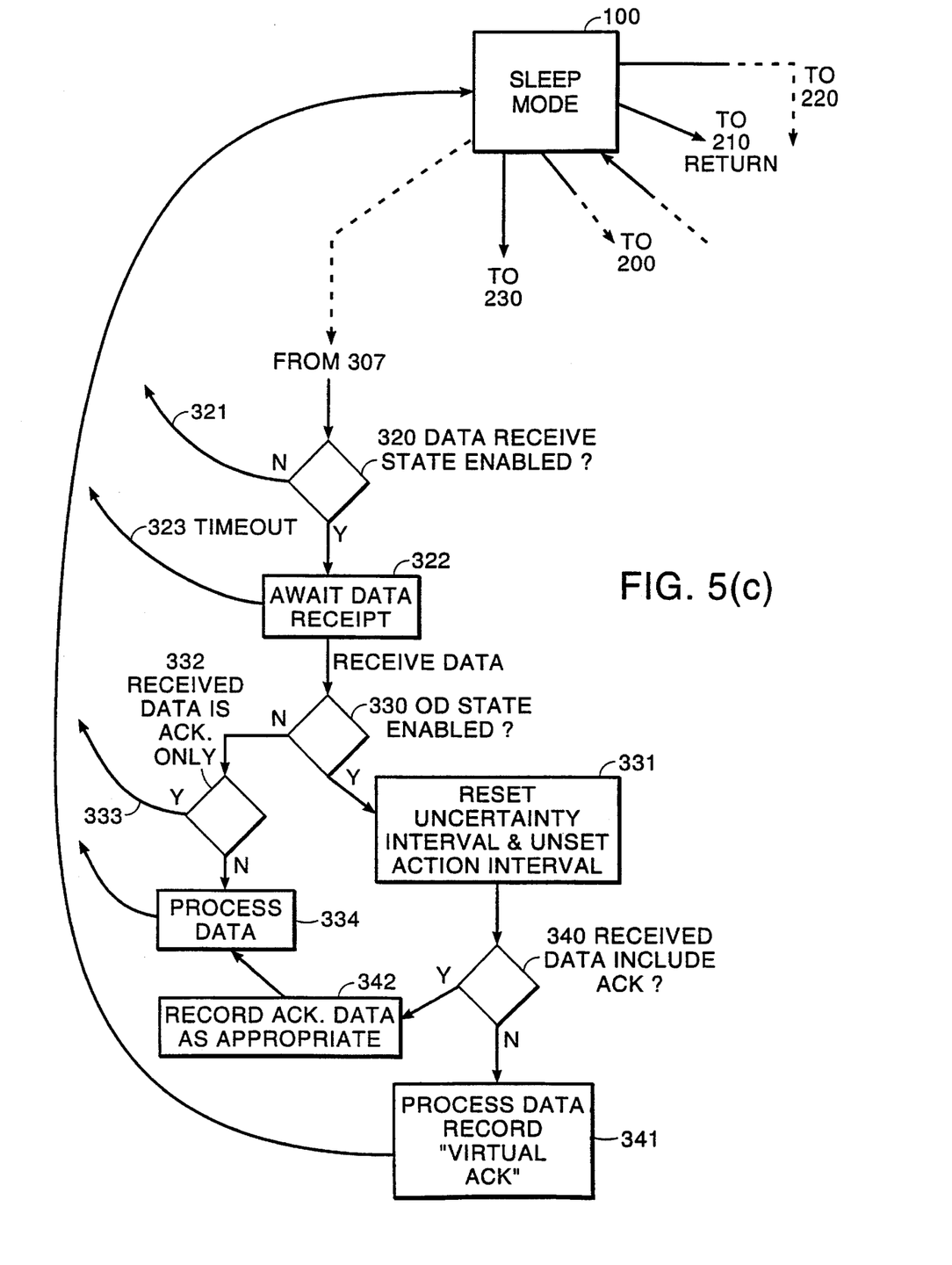

FIGS. 5(*a*), 5(*b*) and 5(*c*) illustrate the operation of an active badge system according to this invention. The left branch of the flow chart, beginning with stimulus 101, uses some of the features discussed in FIG. 4 as its basis. As illustrated in FIG. 5(*b*) the badge moves out of its sleep mode 100 due to some internal or external stimulus 101 just as in FIG. 4. However, the next function the badge performs 301 is dependent on whether or not it wants the station to acknowledge its transmission. A discussion of this test and how a badge processes transmissions to and from a sensor station according to this invention will occur after discussing the branches to the right.

The branches to the right shown in FIG. 5(*a*) relate to the occlusion processes established by this invention. The branches represent one of the following three actions: (1) the carrier or software causes an interrupt 200 that essentially turns off any action a badge would take as a result of a badge remaining occluded from a tracking and identification system; (2) a preset Uncertainty Interval set by the badge lapses 210 due to the fact that the badge has not received any communications from any station or (3) an Action Interval lapses 220 and the badge has not re-established communication with a sensor station. These branches will now be described in more detail.

The Uncertainty Interval determines the time period a badge could be occluded from the system without detection when this invention is operating. The Action Interval is the period between actions that result from occlusion detection when the system is equipped with a feature allowing periodic, repetitive actions.

A badge can be equipped with an occlusion sensing system that is activated either by the carrier, through a program, or through a sensor station. Alternatively, it can be enabled permanently when the device is manufactured. The system illustrated by FIGS. 5 (*a*), (*b*), and (*c*) is assumed to be normally "on", i.e., the badge will perform some action upon expiration of the Uncertainty Interval indicating the badge is being occluded from the sensing system.

As stated earlier, the badge is additionally equipped with interval timers both for an Uncertainty Interval and an Action Interval. One can program the internal timer of microprocessor 18 of FIG. 1 to act as these timers or include separate timing mechanisms in the badge like oscillator 16. If microprocessor 18 is used, it acts independently of astable oscillator 16 which acts as the timing mechanism that establishes the sleep mode interval for the device. The interval timers can either be set for a predetermined time at manufacture or can be programmed for various timer intervals. When variable, the interval timers can be controlled by the carrier or by signal from a sensing station or a central computer. The mechanism for setting or unsetting the interval timers may be as simple as a signal from a program or can be hard-wired to discrete timing devices.

Normally, one would want both the Uncertainty Interval and the Action Interval to be different from the normal awake plus sleeping interval established for the badge. Typically, the Uncertainty Interval is longer than the sleep plus awake mode interval established for the badge. Therefore, a badge can send more than one acknowledgement request within the Uncertainty Interval time period. The Uncertainty Interval is dependent on the application, since this interval is the period the system or user will allow the badge to be occluded without the badge recognizing it. The Action Interval is similarly application-dependent since it determines the period of time between occlusion actions once a badge becomes occluded from the locating system. Thus, dependent upon the locating system and whether it contains a repeat action function 222, either the lapsing of the Action Interval 220 or the lapsing of the Uncertainty Interval 210 for the badge could lead to the badge taking the appropriate occlusion action 221.

As stated earlier, the actions taken by the badge can vary depending on the use of the badge. The badge of FIG. 1 could use either sounder 24 or LEDs 22 as signals to a carrier or an agent in the vicinity that the badge is occluded. It could also accomplish a variety of actions through its program, e.g., turn itself off, change its operation, change its transmission or listening period, retransmit, etc. Also the badge at 221 can change its state to indicate its occlusion. In addition, an I/O port like I/O Port 20 in FIG. 1 can be used to cause an action to occur external to the badge.

The action(s) taken as a result of the timer expiration may occur once, continuously (until reset by a sensor station or coproximate agent command), or periodically (until reset by a sensor station or coproximate agent command). The reset may be effective until some associated Action Interval expires or until the next acknowledgement is received. For example, a tone may be sounded once, or continuously, or periodically. The action(s) taken may be fixed at badge build time or may be programmable by a coproximate agent or by commands sent from a sensor station.

FIG. 5 (a) illustrates a badge that could provide occlusion actions once or repetitively. It is accomplished by providing for a test 222 to determine whether the badge has the Repeat Action Periodically feature enabled or disabled. If it is enabled, the badge resets the action interval at 223, and the device will repeat the action when the action interval expires, assuming that the badge remains occluded. Note that the action interval need not remain fixed for the life of the badge or for a given period of occlusion. Depending on the circumstances the device could be programmed to increase or decrease the interval or in some other manner change the mode of operation for the device. If the Repeat Action Periodically feature is not enabled, the badge returns to its sleep mode state through path 224 without resetting its action interval. Thus, the occlusion actions are turned off until the actions are turned back on through some other stimulus 230 or the Uncertainty Interval elapses 210. Again some other action can be performed by this branch, e.g., turning the device completely off or performing some other pre-programmed function.

The Unset Action Interval interrupt 200 in FIG. 5(a) is a feature of this invention that allows the carrier or some external stimulus to "turn off" any action that would result from the badge being occluded. This interrupt may occur through a program installed in the badge, by a command from the system, or simply by some manual action, such as the carrier or some agent pushing a button. All that need be applied is some stimulus 200 that turns off the Action Interval timer in the badge.

Related to interrupt 200 is Reset Uncertainty Interval interrupt 230 and action 231. Action 231 responds to stimulus 230 and sets the Uncertainty Interval independent of the stimulus 101. Like interrupt 200, this stimulus may occur through a command from the system, a program installed in the badge, or simply through a manual action. This allows the carrier or an agent who just obtained access to the badge to override interrupt 200, as well as to get a determination of the occlusion status of the badge.

Returning to the left branch of the badge portion of the occlusion system FIG. 5(b) and stimulus 101, the next stage introduces test 301 for the badge that asks whether the Occlusion Detection state is enabled. The Occlusion Detection ("OD") state determines whether badge occlusion checking occurs in the badge (i.e., the badge will not check for occlusion, and therefore will not take occlusion-detection actions, unless the OD state so indicates).

Related to the OD state is the Please Ack ("PA") bit in the message format. The PA bit is a field reserved in the packet of data transmitted by the badge that indicates whether a recipient sensor station should acknowledge the broadcast.

For example, if the PA bit is 1, then the sensor station should send an acknowledgement; otherwise (PA=0), the sensor station need not send an acknowledgement. If the OD state is enabled the badge prepares to send a transmission with an identification signal 302 that indicates that the PA bit is set. If the OD state is not enabled the identification signal 303 is prepared with the PA bit unset.

The next test 304 for the occlusion system is to determine whether or not the Append Station ID ("ASI") state is enabled. If the badge wants information regarding which sensor station is receiving its information, it will set the ASI bit in an appropriate field in the packet of data it transmits. If the badge does not, the bit will be unset. If the state is enabled, take badge will prepare the transmission 305 with the ASI bit set. If ASI is not enabled, the bit will be unset in action 306.

Now the badge is prepared to transmit, and the next action 307 is the transmission of pertinent information from the badge.

Referring to FIG. 5(c), the badge next performs test 320 to determine if the Data Receive state on the badge is enabled. If it is not enabled, the badge returns to its sleep mode 101 as illustrated by branch 321. The related state may be implicit or explicit. If implicit, then the badge is built to always listen or never listen. If the latter is the case, the badge will not be able to determine its own occlusion. In general, badges that are able to listen for sensor station data may be able to listen at all times or only in restricted circumstances. Whether the badge listens for sensor station data at any possible listen time may be fixed at badge build time or may be controllable by programmed rules inside the badge.

A badge may avoid listening in order to conserve battery life, e.g., if the badge determines that its power source is sufficiently diminished, or because the carrier is off-duty. Another alternative for the badge is to implement a "listen after transmission" policy of listening for station data only for a small window of time immediately after transmitting.

If a badge is in a condition to receive data it waits for a transmission 322. The period for listening and awaiting a return signal is either preset at the time the device is manufactured or may be controlled through rules established in the program for the badge. If the badge does not receive data within the listening period established for it, the badge performs timeout 323 and returns to its sleep mode. If it does receive a transmission, the badge branches at 330 dependent on whether the OD state in the badge is enabled. If the OD state is enabled, the badge will reset its Uncertainty Interval at 331. That is, the badge will reset the time which it will wait for the receipt of a transmission from a sensor station before taking some (occlusion-related) action. This can be accomplished by resetting the internal timer of microprocessor 18 of FIG. 1 which acts as the timing mechanism for the Uncertainty Interval. Ancillary to resetting the Uncertainty Interval it will also unset the Action Interval and can change its internal state to indicate it is not occluded. Unsetting the Action Interval is necessary since the data received may be the first occurring after the badge was occluded from the system. (I.e., the badge has just re-established communication with the locating system.)

After action 331, the badge performs test 340 on the data to determine whether the data contain an acknowledgement from the sensor station. If the answer is no, the device records through action 341 the fact that it is receiving a transmission from a sensor station (i.e., a virtual acknowledgement that the badge is not occluded). It will also through action 341 process the data as appropriate and then return the badge to its sleep mode or idle state. If the data contain an acknowledgement, the badge will record the acknowledgement data through action 342 and process the data as appropriate (334) prior to returning to its sleep mode or idle state 100.

If the OD feature of the badge is not enabled under test 330, the badge performs a test 332 to determine whether the information is solely an acknowledgement by the sensor station or whether it also contains other data. If it is an acknowledgement, the device returns via path 333 to its sleep mode or idle state. If it is data other than an acknowledgement, the information is processed by the badge through action 334 dependent on its content prior to the badge's return to sleep mode 100.

Figure 6:
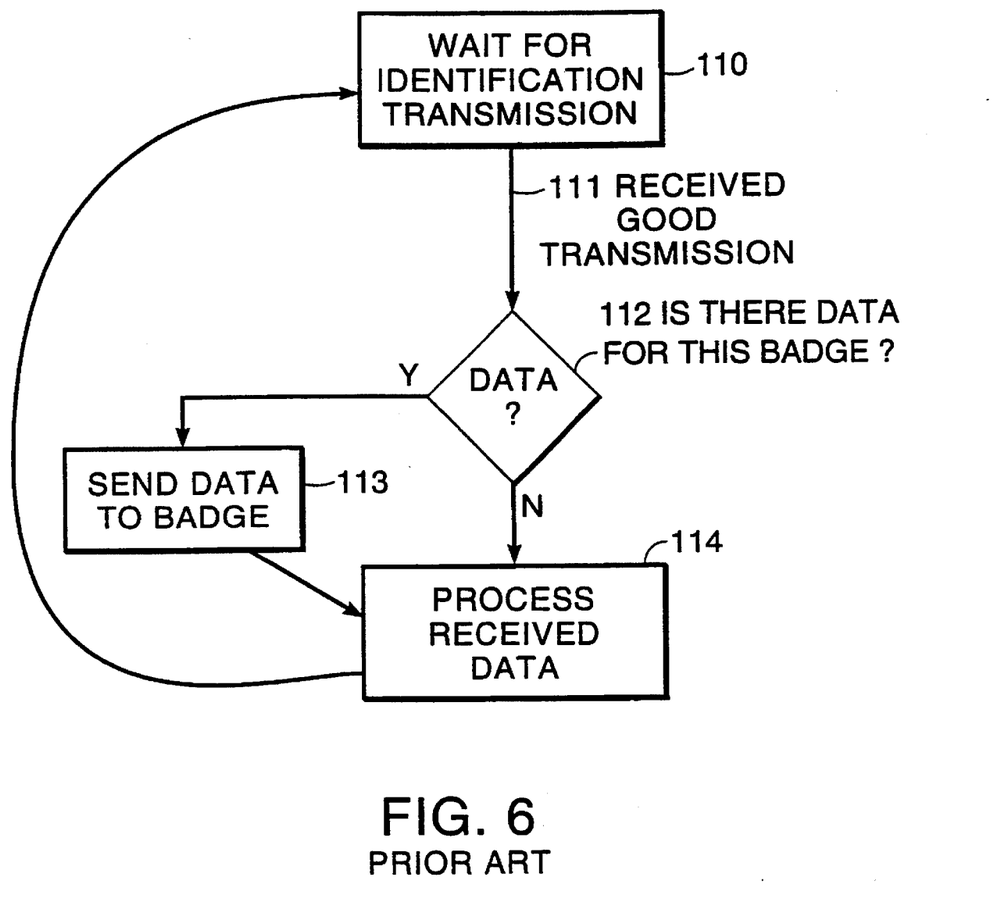
FIG. 6 is a functional flow chart illustrating the operation of a conventional prior art sensor station in a locating system.

FIG. 6 is a drawing of the conventional functional processes taking place within a prior art sensor station. At 110 the sensor station is functioning in its normal mode waiting for a transmission from a badge or badges within the area assigned to that station. Once the sensor station receives a transmission at 111 the sensor station compares the ID code of the badge with its database at 112 to determine whether it possesses data for the badge. If the answer is yes, the station through action 113 sends the data to the badge, then processes the data received through action 114 and returns to its normal state 110 waiting for transmissions. If the answer is no, it simply processes the data and returns to its normal state.

Figure 7:
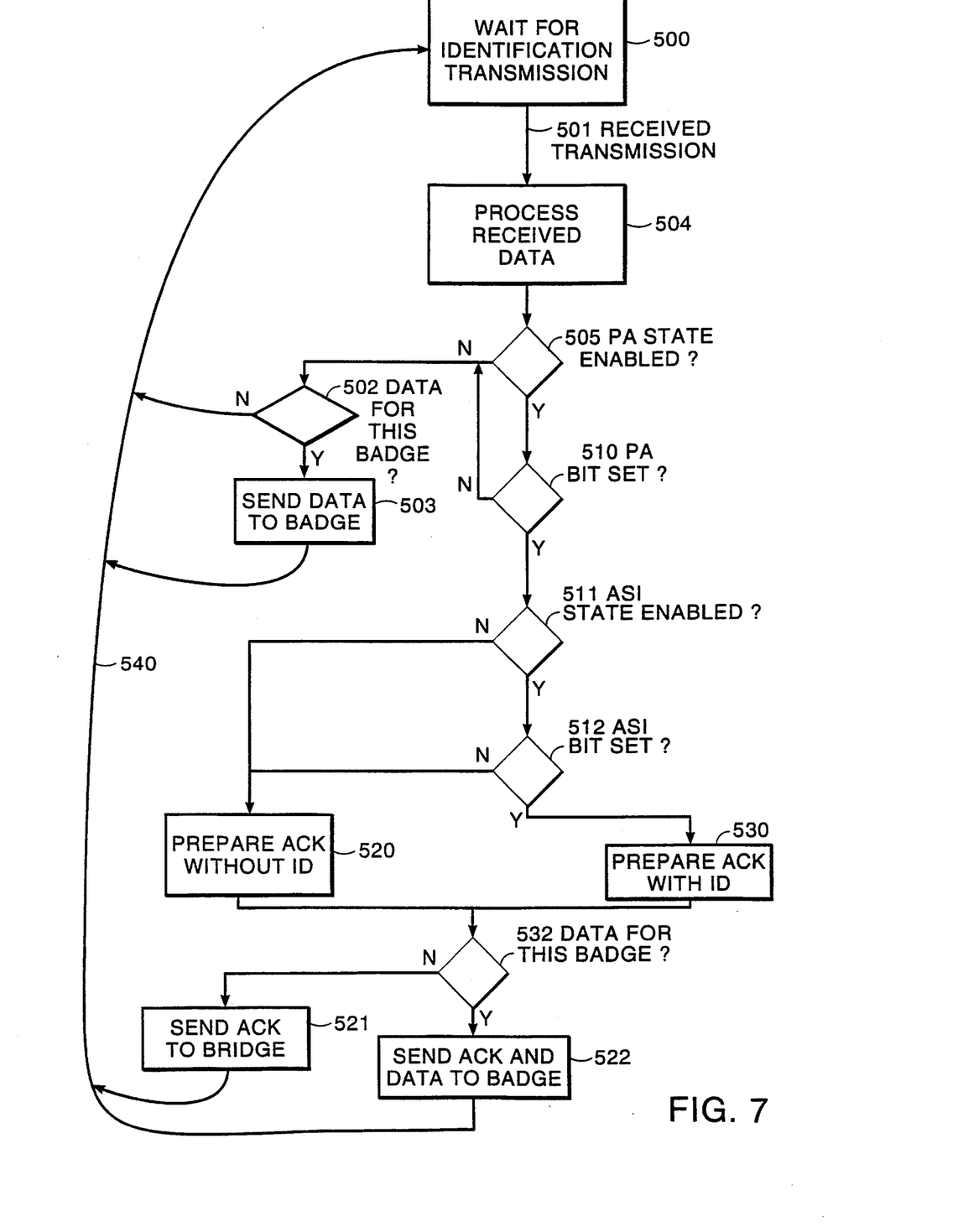
FIG. 7 is a functional flow chart illustrating the operation of a sensor station that incorporates this invention.

FIG. 7 is a drawing of the functional processes taking place inside a sensor station according to this invention. A sensor station like the one shown in FIG. 6 is at block 500 listening for identification transmissions from various badges. Upon the receipt of a good transmission 501 from a badge, the station processes the data received at 504.

The functions of the sensor stations utilizing this invention differ from prior when the concept of the Please Ack ("PA") state and bit are introduced. After the data is processed at 504, station next branches to 505 to determine if the PA function of the station is enabled or not enabled. If it is enabled, the station performs test 510 to determine whether the data packet from the badge has the PA bit set in the appropriate field. If not or if the test at 510 does not have the PA bit set, the station performs a compare at 502 to determine if it has any data for transmission to the badge based on the badge's ID. If there are any data, it performs action 503 and sends the data to the badge. For example, it may be requesting some action from the badge, such as setting an LED. After that the station simply returns to its normal state through path 540 waiting for a transmission from a sensing station. If the station determines there is no data for the badge under test 502, the station simply returns directly to its normal state.

In the embodiment shown an acknowledgement would be generated only if both the PA bit in the badge's message is set and the station's PA state is enabled. However, it is not necessary that the station have the ability to turn the PA function on and off. That is it can always acknowledge the badge's transmission. In addition, functions 505 and 510 can just as readily occur in reverse order.

If the PA bit of the badge transmission is set, the next test at 511 determines whether the station's ASI state is enabled. The Append Station ID ("ASI") bit is part of the sensor station's state, and it determines whether the sensor station appends its id to an acknowledgement it is preparing to send. For example, if ASI is 1, then the base station will append its id; otherwise (ASI=0), the sensor station will not append its id.

If the ASI state of the station is not enabled, the station prepares an acknowledgement without an ID through action 520. If the ASI state is enabled, the station performs another test 512 to determine if the ASI bit is set in the transmission to the station. If the bit is not set the station prepares an acknowledgment without an ID through action 520. Of course, steps 511 and 512 could be performed in reverse order. If the bit is set, the station at 530 prepares an acknowledgement with the station ID. The next step 532 performs a similar query to 502 above and determines whether there are any data for this badge. If there are data, both an acknowledgement and the data are sent to the badge by action 522. If there are no data, the station executes action 521. After actions 521 and 522 the station then returns to its waiting for transmission state 500 through path 540.

In the discussions involving the PA, 0D, ASI, Data Receive, and Repeat Action Periodically bits and states it is important to note the bits and states may be implicit or explicit. If implicit, then the badge and the sensor station are implemented with PA, OD, or ASI effectively set to one of the two values, i.e., enabled or not enabled for states or 1 or 0 in the case of bits. For example, if a station's PA state is implicitly enabled, then the sensor station will always send an acknowledgement. If the PA bit in the badge's message is explicit, then the PA bit setting is controlled by the OD state in the badge that determines the PA bit setting in any given transmission. The setting of the OD state may be changed by internal or external stimuli or prompts (i.e., the badge itself may have rules for changing the 0D state, or the badge may change the 0D state as a result of a received command). In the case of ASI, if ASI is implicitly "on" in both the badge and stations, then the sensor station will always append its ID, and the badge will always interpret the acknowledgement as incorporating an ID. If ASI is explicit, then the setting of ASI may be changed by internal or external stimuli (i.e., the sensor station itself may have rules for changing the ASI state, or the sensor station may change ASI as a result of a received external input). In fact, the concept of a selected bit could be further generalized to include the concept of using some token or word available in a message.

This invention solves an important problem that arises in the use of badges. This increases their functionality as perceived by potential customers. For example, suppose we have a system in which individual badges and base stations communicate by infrared signals. If such a device is attached to a patient in a hospital, the device might be occluded from time to time by a blanket or garment; this would interfere with the locating and tracking functions of the hospital locating system, thereby reducing the system's utility to the patients and staff. Using the invention, such occlusion would be detectable by the device, and a coproximate agent (the patient or a caregiver) could remove the source of occlusion (e.g., by repositioning the device or the blanket). A similar importance pertains to inanimate objects; if such a device is attached to a piece of equipment and an obstacle prevents the device's broadcasts from reaching base stations, then the utilization of the equipment will decrease, and the productivity of the potential users will decrease, because the equipment may not be found. The invention allows the device attached to the equipment to detect and signal occlusions.

Not only are many other applications of the system possible, but various modification of the illustrated embodiment are possible, within the scope of the invention. This occlusion detection scheme can be tailored to a variety of badges, sensor units, and locating and communication systems. For example, it can use a variety of wireless communication mediums. Also whether all of its features are important will depend on the particular use to which the system is applied.

What is claimed is:

1. An improved tracking and identification communication system which comprises: a plurality of badges, each badge carried by an object, each badge having a transmitter circuit for transmitting an identification signal and a receiver for accepting external communication; a plurality of transceiver sensor stations which are positioned to communicate with the badges within a predetermined area;

an uncertainty interval timer in the badge which initiates an action upon lapse of an uncertainty interval;

a transmitter in the badge that sends a request for acknowledgement to the sensor stations during the uncertainty interval;

a sensor station which acknowledges the requests from the badge; and a reset mechanism which resets the uncertainty interval timer upon receipt of a signal from the sensor station.

2. A system as in claim 1, wherein the transmitter in the badge contains a means for signaling a PLEASE ACK request in data which are transmitted to a sensor station and the sensor station contains a means for decoding this request.

3. A system as in claim 2, wherein the means for signaling a PLEASE ACK request is a bit in the field of data which can be set to one or zero dependent upon whether the badge is requesting acknowledgement.

4. A system as in claim 1, wherein the sensor station includes a means for determining the station's PA state and which when enabled acknowledges PLEASE ACK requests from the badge and when not enabled ignores such requests.

5. A system as in claim 1, wherein the badge has a means for repeating the action taken when an action interval expires.

6. A system as in claim 5, wherein the means for repeating the action is an action interval timer set so when the action interval lapses the badge performs some action.

7. A system as in claim 5, wherein the badge has a means for enabling or disabling the means for repeating the action.

8. A system as in claim 5, wherein the badge has a means for adjusting the period for the action interval timer.

9. A system as in claim 1 which includes a means for resetting the uncertainty interval independent of receipt of a signal from a sensor station.

10. A system as in claim 9, wherein the system additionally comprises a means for adjusting the uncertainty interval timer.

11. A system as in claim 1, wherein the system additionally comprises a means for disabling the uncertainty interval timer.

12. A system as in claim 1, wherein both the sensor station and the badge have states that determine whether or not there will be an acknowledgement.

13. A system as in claim 12 wherein the system can vary the states.

14. A system as in claim 9 wherein the system can report the status of its states to a central computer and the central computer can vary the states.

15. A system as in claim 2, wherein the badge includes a means for determining the badge's OD state.

16. A system as in claim 15, wherein the badge has a means for repeating the action taken when an action interval expires and also includes a means for unsetting the action interval upon receipt of a signal from a sensor station.

17. A system as in claim 2, wherein the transmitter in the badge contains a means for signaling an ASI request in data which are transmitted to a sensor station and the sensor station contains a means for decoding this request.

18. A system as in claim 17, wherein the means for signaling is a field for an ASI bit which can be set to one or zero dependent on whether the badge is requesting a station ID from the sensor station.

19. A system as in claim 17, wherein the means for repeating the action allows for variation in the action interval.

20. A system as in claim 17, wherein the badge has a means for disabling the action interval.

21. A badge which operates as part of a tracking and identification system, the badge comprising:

a transmitter for transmitting an identification signal and a receiver for accepting external communications from a plurality of sensor stations;

an uncertainty interval timer in the badge set so that when an uncertainty interval lapses the badge initiates an action;

the transmitter in the badge additionally comprising a means for sending requests for acknowledgement to the sensor stations during the uncertainty interval;

the receiver in the badge additionally comprising a means for receiving acknowledgements from the sensor stations; and a reset mechanism which resets the uncertainty interval timer upon receipt of a signal from the sensor stations.

22. A badge as in claim 21, wherein the badge additionally comprises an I/O port for initiating actions external to the badge.

23. The badge as in claim 21, wherein the badge further comprises a means for repeating an action when an action interval expires.

24. A badge as in claim 21, wherein the badge further comprises a means for determining the badge's OD state.

25. A method for determining the occlusion state of a badge in a system for tracking and identifying movable objects each object carrying a badge, each badge having a transmitter circuit for transmitting an identification signal and a receiver for accepting external communications from a plurality of sensor stations, each sensor station positioned to communicate with badges within a predetermined area, the method comprising the steps of:

setting an interval timer in the badge for a set period of time;

stimulating the badge to transmit a request for acknowledgement to the sensor station during the set period of time;

listening for an acknowledgement from the sensor station;

undertaking an action if the badge fails to receive a transmission from a sensor station within the set period of time; and resetting the interval timer if a transmission is received by a station prior to the lapse of the set period of time.

26. A tracking and identification system having a badge carried by an object and a plurality of transceivers communicating to a fixed location, comprising:

means for said badge transmit a first message to at least one of said plurality of transceivers;

means responsive to receipt of said first message, for said plurality of transceivers to transmit a second message to said badge;

means responsive to said badge receiving said second message within the timeout period, for said badge to retransmit said first message within the next timeout period; and means responsive to said badge not receiving said second message within said timeout period, for said badge to initiate an action.

* * * * *